United States Patent [19]

Dunkerton et al.

[11] Patent Number: 4,758,833
[45] Date of Patent: * Jul. 19, 1988

[54] PAGING UNIVERSAL REMOTE CONTROL DECODER

[75] Inventors: Stephen H. Dunkerton, Riverwoods, Ill.; David R. Petreye, Margate, Fla.; Scott G. Chapman, Schaumburg, Ill.

[73] Assignee: Motorola, Inc., Schaumburg, Ill.

[*] Notice: The portion of the term of this patent subsequent to Jan. 26, 2005 has been disclaimed.

[21] Appl. No.: 487,488

[22] Filed: Apr. 22, 1983

[51] Int. Cl.⁴ .............................................. H04Q 1/00
[52] U.S. Cl. ......................... 340/825.44; 340/825.48
[58] Field of Search ........... 340/311.1, 825.44, 825.47, 340/825.48; 375/68, 5; 370/111; 455/92, 33, 36, 54, 31; 364/728, 421; 379/57, 103

[56] References Cited

U.S. PATENT DOCUMENTS

| 2,974,281 | 3/1961 | Feldman | 370/111 X |
| 3,311,704 | 3/1967 | Filipowsky et al. | 370/111 X |
| 3,529,088 | 9/1970 | Hauer | 370/111 |
| 4,002,982 | 1/1977 | Catania | 375/5 X |
| 4,418,416 | 11/1983 | Lese et al. | 375/5 |

Primary Examiner—Ulysses Weldon
Attorney, Agent, or Firm—Winfield J. Brown, Jr.; Joseph T. Downey; Anthony J. Sarli, Jr.

[57] ABSTRACT

A paging station remote control system decoder is described. The paging system decoder is responsive to signals generated in accordance to a signalling scheme comprising a series of tones and timed pauses generated by a paging system encoder. The paging system decoder then causes a paging transmitter station to key in an analog or binary modulation mode or to switch from one mode to another without first dekeying the paging transmitter.

21 Claims, 4 Drawing Sheets

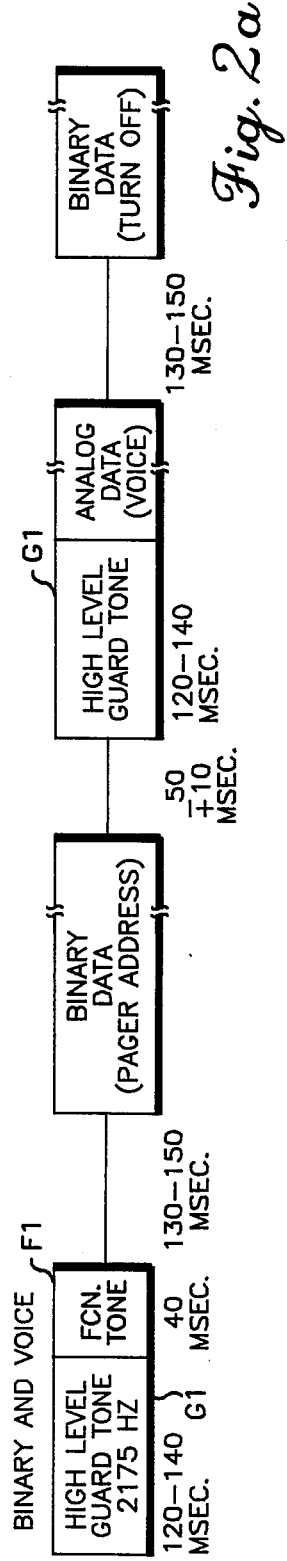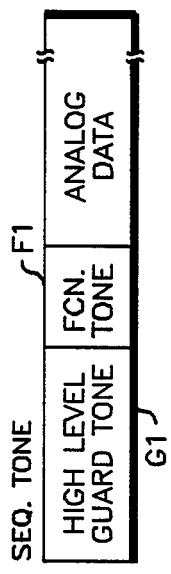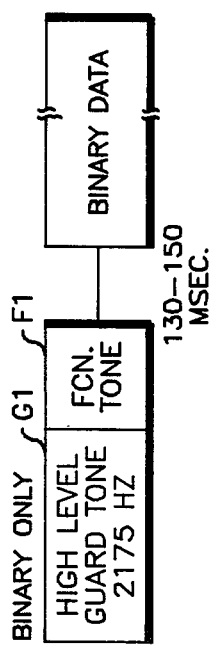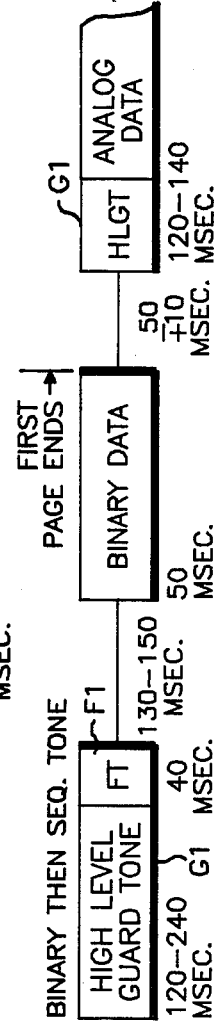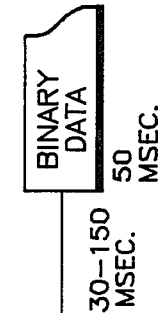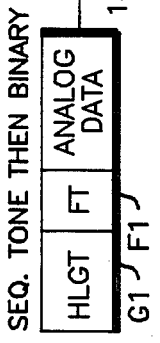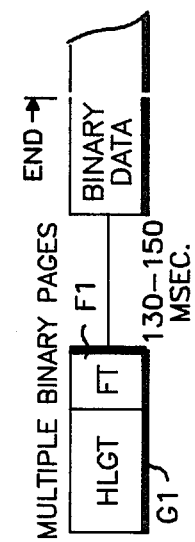

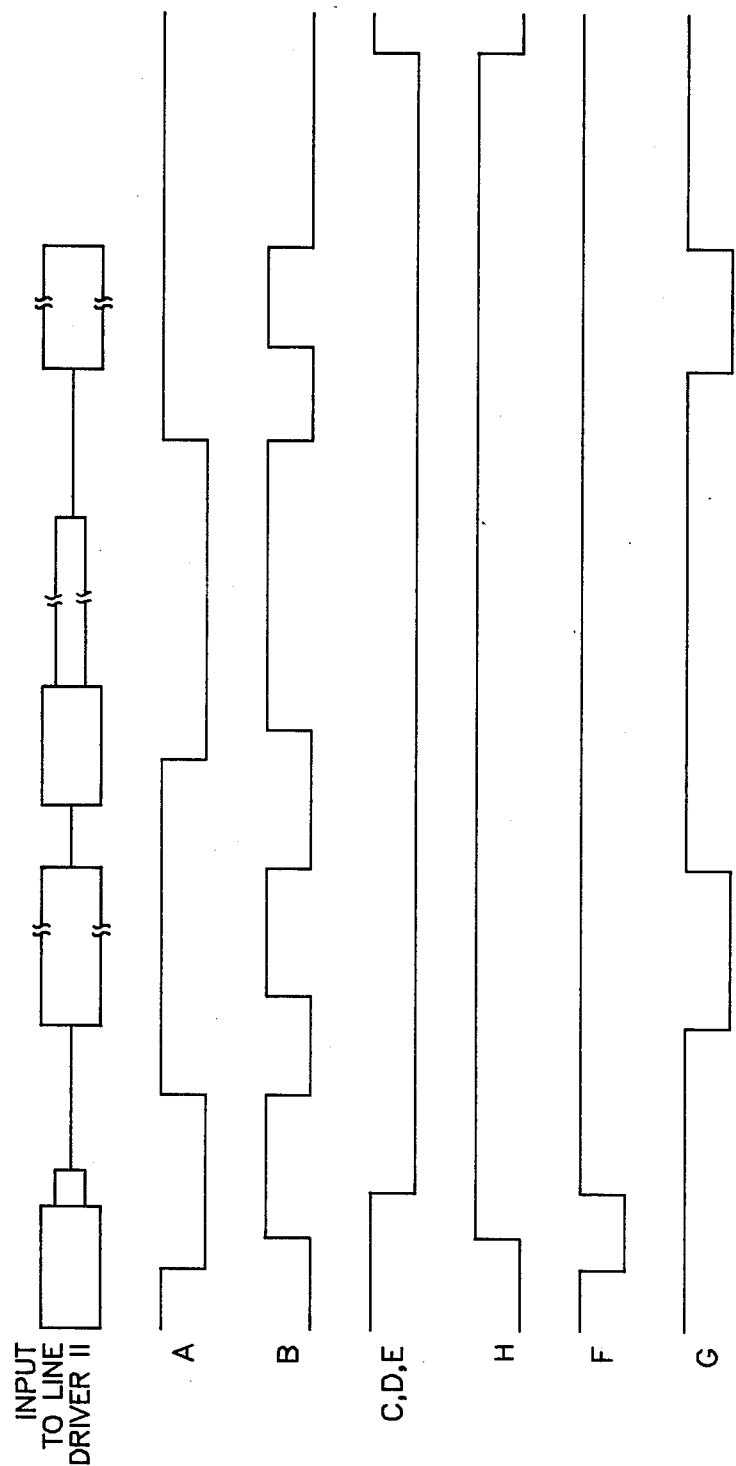

PAGING UNIVERSAL REMOTE CONTROL DECODER

BACKGROUND OF THE INVENTION

This invention relates to the field of the paging base station and terminal communications using both binary signalling and analog signalling, and more particularly to the signalling scheme and apparatus for implementing a base station and terminal communications link for interactively transmitting both binary and analog signals.

In the past a paging base station was required to dekey its transmitter when changing from transmission of an analog signal to transmission of a binary signal or vice versa. To initiate an analog page, conventional paging systems utilize a sequence of a high level guard tone signal, a function tone signal and a tone or voice signal accompanied by a low level guard tone signal. To enter a binary paging mode, a prior art remote control paging encoder removes all activity from the remote control link for at least 300 ms causing the transmitter to dekey. The transmitter then rekeys in the binary mode after the remote site received a burst of FSK paging signals from the paging system encoder, equivalent to a binary comma for 100 ms.

A prior art paging system of this type is described in Motorola document No. 68P06905B33 (1980) entitled "MICOR Tone and Binary Paging Transmitter Station." This instruction manual is available from the Service Publication Department of Motorola, Inc., 1301 East Algonquin Road, Schaumburg, Ill. or from Motorola C & E Parts, 1313 East Algonquin Road, Schaumburg, Ill.

This is disadvantageous in certain respects. By requiring dekeying of the transmitter, a signal such as a binary page followed by a voice message must be dekeyed after the binary signal and then rekeyed for the analog voice portion of the transmission and then dekeyed again and rekeyed for a binary end of transmission message. The result of this was a noise burst at the end of the voice message and prior to the binary turn-off code for the pager. The noise burst resulted from the loss of carrier from dekeying the transmitter.

It is well known that different modulation techniques are necessary for the appropriate transmission of binary and analog signals. Therefore, it is desirable to have a technique whereby both analog and binary signals can be sent to a pager by way of different modulation schemes without first dekeying the paging base station. Moreover binary pagers with voice messages require the base station to quickly transfer from an analog modulation mode to a binary modulation mode. Therefore, it is important to provide a signalling scheme whereby the base station can perform such a transition with a minimum of effort and without introducing extraneous signals that might be picked up by the binary pager. Also, dekey/rekey reduces system throughput which is undesirable on heavily loaded channels.

SUMMARY OF THE INVENTION

Briefly described, the present invention contemplates a paging system remote control decoder which is responsive to a signalling scheme comprising a series of predetermined tones and timed pauses. The paging system decoder causes a paging transmitter to selectively transmit analog or binary information signals and the paging system decoder sequentially detects first and second control tones and provides a path for the transmission of analog signals. If an analog signal is not transmitted, the paging system decoder searches for a binary information signal if the analog information signal is not received for a predetermined period of time. The paging system decoder interrupts the analog signal path if the binary information signal is detected, and if the binary signal is not detected for a predetermined period of time, the paging system decoder searches for the first control signal, and in response to detecting the control signal, enables the analog signal path. The analog and binary signal paths are enabled and interrupted without first dekeying the transmitter.

It is a general object of the invention to provide an improved decoder for controlling a paging base station in response to a predetermined signalling scheme.

It is a more specific object of the invention to provide a decoder capable of processing a specially formatted signal to cause a paging base station incorporating the decoder to change its modulation mode from analog to binary or vice versa without first dekeying its transmitter.

BRIEF DESCRIPTION OF THE DRAWINGS

FIG. 2 shows a specifically formatted signalling scheme used in communication link between a paging terminal and a paging base station which incorporates a decoder according to the invention.

FIG. 4 is a timing diagram showing various signals generated by the decoder of FIG. 3.

DETAILED DESCRIPTION OF THE PREFERRED EMBODIMENT

Figure 1A:
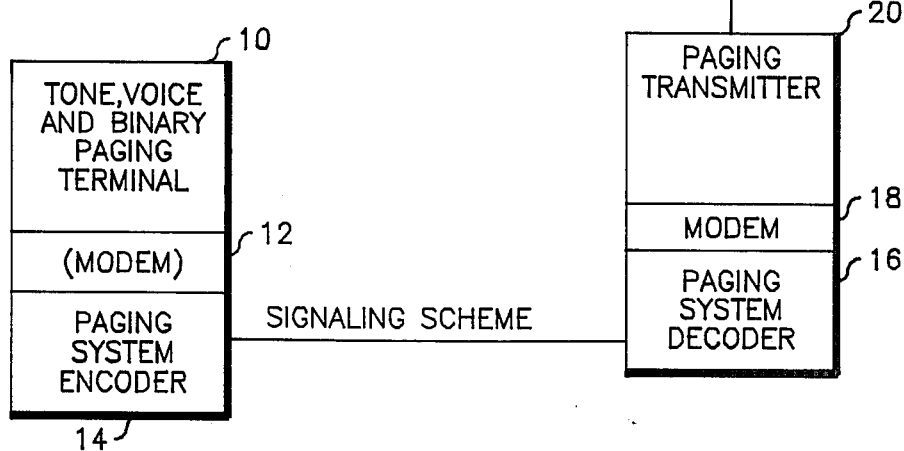
FIGS. 1a and 1b block diagrams of two paging systems of the type which utilize a decoder according to the present invention.

FIG. 1 shows a block diagram of a paging system of the type which embodies the signalling scheme utilized in the present invention. The illustrated paging system includes of a paging terminal (10) adapted to provide analog or binary paging signals. The paging terminal interfaces with a modem 12 and a paging system encoder 14. The paging system encoder is described in U.S. Pat. No. 4,600,922 entitled PAGING UNIVERSAL REMOTE CONTROL ENCODER by Dunkerton et al, and assigned to the assignee of the present invention. The modem 12 is a conventional device which converts a binary signal from the paging terminal 10 to a frequency-shift keying (FSK) signal used by the paging system encoder 14. The paging terminal 10 cooperates with the paging system encoder 14 by providing signals to the encoder 14 which indicate that the paging terminal 10 is about to transmit binary or analog signals. The encoder 14 then signals the paging terminal 10 when the encoder is ready to receive either type of signalling. An exact description of the paging terminal and the interface signals required by the paging system encoder are described in Motorola document 68P81063E15 (1982) entitled "Simulcast System Controller and PURC Station Controller" available from the Service Publication Department of Motorola, Inc., 1301 East Algonquin Road, Schaumburg, Ill., or from Motrorola C & E Parts, 1313 East Algonquin Road, Schaumburg, Ill.

The encoder 14 then generates a series of tones and timed pauses which are especially formatted and communicated to a paging base station which includes station decoder 16. The decoder 16 converts the formatted signals from the encoder 14 and selectively activates modem 18 and transmitter 20 in predetermined timed sequences as determined by the signals from the encoder 14. The paging transmitter 20 can then be selectively switched between analog or binary transmissions in response to the signals received from the encoder 14. The combination of a decoder, modem and transmitter is referred to as a paging base station.

Figure 1B:
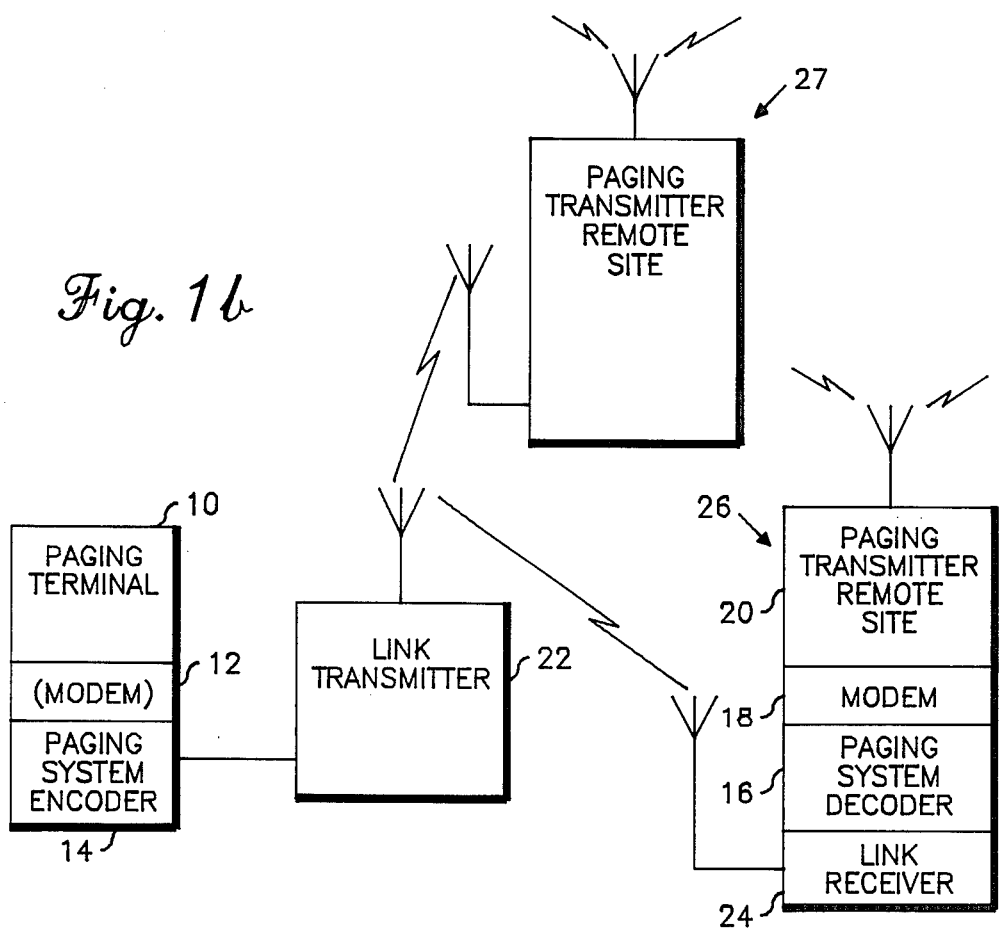

The paging system encoder and decoder can be connected in several ways. FIG. 1a shows an encoder and decoder being connected through a terrestrial wire-line. Referring now to FIG. 1b, the paging system encoder and decoder can also be connected through a communications link provided by a radio link transmitter 22 and a radio link receiver 24. In addition, the paging system signalling scheme can be expanded to control any number of additional simulcast paging transmitter remote sites 27, as shown in FIG. 1b.

The signalling scheme shown in FIG. 2 has been developed to unify the base station control functions required in paging systems utilizing both binary and analog signalling. Most commonly, the analog signalling is in the form of sequential tone signalling. For the base station there are three modes of operation: (1) binary (FSK signalling), (2) audio (sequential tone signalling or tone and voice signalling), and (3) combinations of both binary and audio signalling.

Control of the paging base station is accomplished from paging terminal 10 which operates in conjunction with the paging system encoder 14 and is located either remotely or locally with respect to the paging transmitter 20. FIGS. 2A through 2F show that the station control sequence is preferably initiated by a high level guard tone G1 of 2175 Hertz for a period of 120 to 140 milliseconds followed immediately by a 40 millisecond function tone F1 of 1950 Hertz. These two sequential tones are transmitted by the encoder 14 and are intended to signal the base station to turn on its transmitter in preparation for transmitting a binary or analog signal to a pager unit. The pager base station transmitter need only be rekeyed if more than 350 milliseconds have lapsed since the last transmission.

A combination of binary data and analog data transmission is required for paging systems with mixed binary and tone signalling or tone and voice pagers which use binary signalling. The timing scheme in FIGS. 2A through 2F allows interactive analog and digital paging without dekeying the transmitter. FIG. 2A through 2F show the time spacing of analog and binary signals that are preferred for the paging base station to respond appropriately. In FIGS. 2A, 2B, 2D and 2E, it can be seen that for transmission of a binary signal after a high level guard tone-function tone is sent, a pause of 130 to 150 milliseconds is preferably inserted into the transmission before sending the binary data. The pause of a 130 to 150 milliseconds tells the decoder at the paging base station that there is no analog data and it allows transfer to a binary modulation mode upon receipt of binary data.

If analog data is to be sent immediately following a binary data transmission, a pause of 50 milliseconds is inserted between the end of the binary data and the beginning of the high level guard tone signal (G1). This insures that the paging base station has sufficient time to return to a condition in which it can sense a high level guard tone. Note in FIG. 2A that after the binary data has been received and transmitted by the paging base station and a pause of approximately 50 milliseconds has elapsed, only the high level guard tone need be transmitted to the paging base station to enable the paging base station in an analog modulation mode. The function tone is no longer necessary since the paging base station transmitter has been keyed previously and insufficient time has elapsed between pages to cause the base station transmitter to dekey.

Referring to FIG. 2A, a remote or local paging terminal transmits to a paging base station a high level guard tone function tone sequence G1, F1 to instruct the base station transmitter to key. After the guard tone-function tone sequence has been transmitted to the paging base station and has been received by it, the paging base station transmitter is immediately in a modulation mode that is appropriate for analog data. FIG. 2C illustrates this condition. Binary data is sent only after a 130 to 150 millisecond pause after the guard tone-function tone sequence. That binary data is sent to the base station via a modem format (1200/2200 Hertz signalling) which is well known. Analog or audio data may be sent immediately after the guard tone-function tone sequence along with a low level guard tone. As will be described later, the analog data signal is combined with a reduced amplitude high level guard tone signal. The reduced amplitude high level guard tone signal is referred to as a low level guard tone.

To initiate an analog modulation mode, a pause of approximately 50 ms, for example, follows the termination of the binary data transmission before the high level guard tone is again transmitted. Immediately following the second high level guard tone, the analog data (in this case a voice) is sent to the base station along with low level guard tone (not shown). A binary turn-off code ends the transmission to the binary pager and therefore follows the voice message after a 130 to 150 millisecond pause in order for the paging base station to know that it may transfer to a binary modulation mode for the turn off code.

FIG. 2B shows the transmission of a binary only page. The base station transmitter is again keyed by a high level guard tone-function tone sequence. The appropriate 130 to 150 millisecond pause then follows the function tone. The pause tells the paging base station that there is no analog data and it may transfer to a binary modulation mode in anticipation of the binary data. The paging base station then receives the binary data after it has transferred to its binary modulation mode.

FIG. 2C shows the timing scheme for a sequential tone page. The high level guard tone-function tone sequence again keys the base station. This time the analog data is immediately transmitted after the function tone since the paging base station is in analog modulation mode immediatly following the function tone. Once data is received in the time period immediately following the function tone, the paging base station will stay in an analog modulation mode until it receives a 130 to 150 millisecond pause.

FIG. 2D shows a binary page followed by a sequential tone page. The first portion of the signal stream is the same as shown in FIG. 2B. After the binary data has been sent and received by the paging base station, a pause of about 50 milliseconds is inserted into the transmission stream to enable the paging base station to condition itself to receive a high level guard tone. The high level guard tone is transmitted from the paging system encoder and received by the paging base station. The paging base station immediately goes to a analog modulation mode and is modulated by the analog data which is immediately received after the high level guard tone.

FIG. 2E shows the signalling for multiple binary pages sent without pause. The timing scheme for multiple binary pages is essentially the same for a single binary page as shown in FIG. 2B. Binary data is simply sent one after the other without pause after the initial 130 to 150 millisecond pause.

FIG. 2F shows a sequential tone followed by a binary page. Again the high level guard tone-function tone sequence keys the paging base station transmitter and also causes the paging base station to enter an analog modulation mode. The analog data is transmitted from the terminal immediately following the function tone and thus the analog data is appropriately modulated. The binary data is sent only after the completion of the analog data and a 130 to 150 millisecond pause.

In the preferred embodiment, the analog signal from the terminal is summed with a control tone that is preferably the same as the high level guard tone, only at a reduced amplitude. This is the low level guard tone previously mentioned which will be described in greater detail with respect to FIG. 3.

In summary, to enable the binary mode after the high level guard tone-function tone sequence has been transmitted, a pause of 130/150 millisecond duration is inserted before sending the binary signal. If multiple binary pages are to be transmitted, the binary data identifying each pager should be sent in sequence without pause. Upon completion of the transmission of the binary information, approximately 50 millisecond pause is introduced before enabling the audio control in the paging base station. After the 50 millisecond pause, a high level guard tone is sent to the paging base station to enable the analog-audio mode. (Note: No function tone is needed after the initial station control set-up). If the paging base station does not receive a signal for a period of 350 milliseconds, the base station transmitter will automatically dekey.

If a binary signal is to be transmitted following an analog/audio signal, the sequence described above is repeated. That is to say, a 130 to 150 millisecond pause follows the guard tone before the binary data is delivered to the pager base station.

Figure 3:
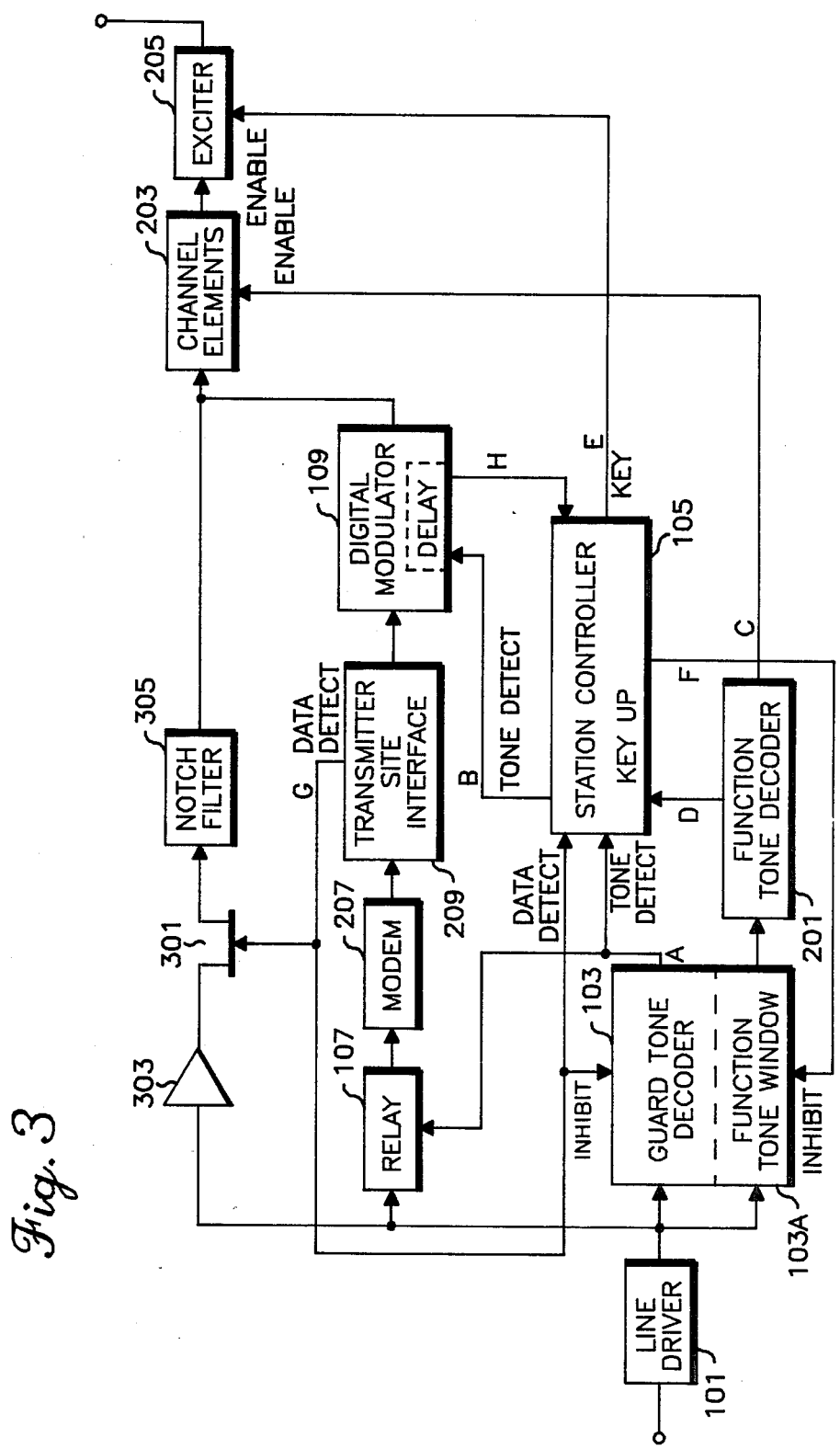
FIG. 3 is a block diagram of a paging system decoder which decodes the signalling scheme illustrated in FIG. 2.

FIG. 3 shows a block and circuit diagram for the paging remote station system decoder that is responsive to the signalling scheme described in FIG. 2. FIG. 4 is an illustration of timing relationships of the control signals generated by the decoder of FIG. 3. A more detailed electrical schematic for the remote station decoder is illustrated in Motorola document 68P8106E70, published May, (1982) entitled "PURC Paging Stations" available from the Service Publication Department of Motorola, Inc., 1301 East Algonquin Road, Schaumburg, Ill., or from Motorola C & E Parts, 1313 East Algonquin Road, Schaumburg, Ill. The decoder receives the page information from a local or remote terminal at line driver 101. The station transmitter is first keyed up when the decoder receives the guard tone-function tone signal from the terminal. The line driver 101 receives the guard tone-sequence function tone and directs it to guard tone decoder 103. The guard tone decoder 103 detects the guard tone frequency and sends a signal A to relay 107 and the station controller 105 which in turn outputs a signal B to a digital modulator 109. Upon detection of a high level guard tone by the guard tone decoder 103, the guard tone decoder enables function tone window 103a which allows the function tone to pass to the function tone decoder 201. Upon detection of the function tone, the function tone decoder 201 generates an output signal C which is delivered to channel element 203 which activates the channel element in preparation for transmission of a signal. A second output from the function tone decoder provides a signal D to the station controller 105. Signal D tells the station controller to key the exciter in the transmitter and thereby fully enable the base station transmitter. Therefore, upon receipt of signal D, the station controller 105 sends a signal E to turn on exciter 205.

Signal A from the guard tone decoder 103 causes relay 107 to open and thus place modem 207 offline. Signal A will be removed from relay 107 and signal B is removed from digital modulator 109 at approximately 130-150 milliseconds after loss of guard tone. Since all analog data is summed with a control tone that corresponds to the guard tone frequency but at a lower amplitude, signal A from guard tone decoder 103 will continue to be applied to the station controller 105 as long as analog data and its guard tone carrier are detected. Therefore, signal A will continue to hold open relay 107 for the duration of guard tone plus an additional time period of approximately 130-150 milliseconds. By activating the exciter 205 with signal E the station controller 105 immediately thereafter disables the function tone window 103a with signal F.

After the guard tone decoder 103 ceases to detect a guard tone, signal A will be removed from the delay enable of station controller 105 within approximately 70 ms. Any further signals received by the line driver from the remote or local terminal will now be seen by the modem 207. The modem 207 will convert the audio FSK received from the terminal to a shifting DC voltage which serves as an input to the transmitter site interface 209.

When the remote transmitter site interface 209 detects active data (active since the modem will consider guard tone as a static data), it will generate a data detect signal G which opens or disables the transmit audio path by way of FET 301. The transmit audio path is defined by amplifier 303, notch filter 305. The notch filter 305 serves to notch out the guard tone frequency. The data detect signal G will remain as long as the transmitter site interface continues to receive binary data from modem 207. Signal G also disables or inhibits the guard tone decoder 103 in order to prevent the falsing of signal A and in addition causes signal B to be applied to digital modulator 109. The transmitter site interface 209 passes the binary data to the digital modulator 109 which modulates the binary data to produce a frequency shift keying-non-return to zero output (FSK-NRZ). The FSK output is applied to the input of element 203 to be transmitted by the base station.

If an analog data or voice message is to follow the binary information, another time period pause of approximately 50 milliseconds is introduced into the signalling scheme as described in connection with FIG. 2. This 50 millisecond time pause allows the transmitter site interface 209 sufficient time to remove the signal G from the FET 31 and station controller 105 and guard tone decoder 103. Therefore, after binary data is no longer detected by the transmitter site interface 209, the data detect signal G is removed over approximate 50 millisecond time period. Immediately thereafter, a high level guard tone is again sent to the decoder and detected by the guard tone decoder 103. This causes signal A to be applied to the relay 107 and station controller 15 which in turn causes signal B to be applied to digital modulator 109.

Immediately after the high level guard tone is received, the analog signal on the guard tone carrier is received. The guard tone carrier keeps signal A from guard tone decoder 103 present at the delay input of station controller 105. The presence of low level guard tone keeps signal A applied to relay 107 for the duration of the voice plus the 130-150 millisecond time delay. The voice message is transmitted through the analog data or audio path and stripped of the guard tone carrier at notch filter 305. At the completion of the voice message, the guard tone decoder 103 no longer receives and detects a guard tone and therefore signal A to the station controller 105 and relay 107 is removed.

After the loss of signal A relay 107 is closed and the modem 207 is on line to receive any binary data from line driver 101. Removing signal B from digital modulator 109, the digital modulator begins a count of between 275-325 milliseconds at the end of which signal H (which appears immediately upon the appearance of signal B) is removed from the station controller 105 which causes signal E to be taken away from exciter 205. Thus, the station transmitter is dekeyed since it has not received any additional binary or analog information for a delay in signal H 300 ms.

As long as any of the signals D and H appear at the station controller 105, the output signal E will keep the exciter 205 enabled and thus the base station transmitter keyed up. By the appropriate delay in deactivating signal B, the station controller 105 provides the decoder ability of interactively handling binary pages and analog pages with analog voice.

In summary, a paging system decoder capable of controlling a paging base station in response to a predetermined signalling scheme has been described. The paging system decoder causes a paging base station transmitter to key in an analog or binary modulation mode and can cause the system to make a transition from one mode to another without first dekeying the transmitter.

Although the invention has been described in terms of a preferred embodiment, it will be obvious to those skilled in the art that many modifications and alterations may be made without departing from the invention. Accordingly, it is intended that all such modifications and alterations be considered as within the spirit and scope of the invention as defined by the appended claims.

We claim:

1. In a paging system in which at least first and second control tones, analog information signals, and binary information signals are transmitted, a method of decoding such transmissions for causing a paging transmitter to selectively transmit the analog or binary information signals, said method including the steps of:
   (a) sequentially detecting the first and second control tones and thereupon providing a path for the transmission of analog information signals to the transmitter;
   (b) searching for a binary information signal if the analog information signal is not received for a predetermined period of time;
   (c) deactivating said analog signal path, and enabling a binary signal path in response to detecting a binary signal after said predetermined period of time; and
   (d) searching for said first control tone and, in response to detecting same, enabling said analog signal path, said binary and analog paths being established without dekeying the transmitter.

2. The method of claim 1, further including the step of establishing said analog signal path in response to an absence of a binary information signal after a second predetermined period of time.

3. The method of claim 1, further including the step of dekeying the transmitter in response to an absence of analog or binary information signals for a third predetermined period of time.

4. A decoder apparatus for use with an analog/binary paging system said decoder linked between a paging transmitter and a paging system encoder, said decoder interpreting information contained in a composite paging signal and switching the transmitter between analog and binary signalling modes, said decoder comprising:
   (a) inputting means for inputting the composite paging signal including binary and analog paging information, as well as tones and pauses arranged in accordance with a predetermined sequence;
   (b) switching means for selectively switching a paging transmitter between analog and binary signalling modes in response to a control signal;
   (c) decoding means coupled to said inputting means for generating said control signal as indicated by said predetermined sequence and selectively activating analog or binary signal paths from said inputting means to said paging transmitter.

5. The decoder of claim 4, wherein the switching means includes a controlling means for selectively enabling the binary signal path to the transmitter to transmit binary paging information signals in response to an absence of analog paging information in the composite paging signal for a first predetermined period of time.

6. The decoder of claim 4, wherein the controlling means selectively enables the analog signal path to the transmitter to transmit analog paging information in response to an absence of binary paging information in the composite paging signal for a second predetermined period of time.

7. The decoder of claim 4, further including a means for terminating the transmission of the binary and analog paging information in response to the absence of the composite paging signal for a third predetermined period of time.

8. A decoder for a paging system transmitter, the transmitter being associated with the decoder for receiving coded information including control information, analog information and binary information, said decoder comprising:
   means for receiving and decoding the coded information to recover the control information wherein the control information includes control signals for activating the transmitter;
   means responsive to said receiving and decoding means to establish a signal path to the transmitter for the transmission of the coded information; and
   means responsive to said receiving and decoding means to detect the absence of the coded information for terminating the transmission of the coded information.

9. The decoder of claim 8, wherein said establishing means being responsive to said receiving and decoding means further includes a controlling means for selectively enabling a particular signal path to the transmitter in response to detecting the corresponding control signal.

10. The decoder of claim 9, wherein said controlling means selectively enables a binary signal path to the transmitter to transmit the binary information in response to detecting a binary control signal.

11. The decoder of claim 10, wherein said controlling means selectively enables an analog signal path to the transmitter to transmit the analog information in response to detecting an analog control signal.

12. The decoder of claim 11, wherein said controlling means being unable to detect an analog control signal for a first predetermined period of time selects the binary signal path.

13. The decoder of claim 11, wherein said controlling means being unable to detect a binary control signal for a second predetermined period of time selects the analog signal path.

14. The decoder of claim 13, wherein the analog control signal includes a first control signal and further wherein said controlling means being selected for an analog signal path provides for the transmission of analog information upon detecting said first control signal.

15. The decoder of claim 8, wherein the detecting means in response to the absence of the coded information for a third predetermined period of time terminates the transmission of the coded information.

16. A method of decoding encoded signals for sending information to a transmitter, the transmitter being associated with a decoder, and wherein the encoded signals include control signals, analog information signals, binary information signals, and deactivation signals, said method comprising the steps of:

(a) detecting and decoding the received encoded signals for recovering the control signals and the information signal and thereupon activating the transmitter in response to the control signals;

(b) establishing a signal path to the transmitter corresponding to the type of received information signals;

(c) transmitting the received information signals; and (d) terminating the transmission of the received information signals from the transmitter in response to detecting a deactivation signal.

17. The method of claim 16, wherein said step (b) of establishing further includes the steps of:

(e) establishing a binary signal path to the transmitter in response to receiving a binary information signal; and (f) establishing an analog signal path to the transmitter in response to receiving an analog information signal.

18. The method of claim 17, wherein said step (e) of establishing further includes the step of selecting the analog signal path in response to an absence of the binary information signal for a first predetermined period of time.

19. The method of claim 18, wherein the step of selecting further includes selecting the analog signal path in response to a first control signal.

20. The method of claim 17, wherein said step (f) of establishing further includes the step of selecting the binary signal path in response to an absence of the analog information signal for a second predetermined period of time.

21. The method of claim 16, wherein the step (d) of terminating further includes the step of terminating the transmission of the received information signals in response to the absence of the encoded signals for a third predetermined period of time.

* * * * *